(12) United States Patent
Tsai et al.

(10) Patent No.: US 9,408,264 B2
(45) Date of Patent: Aug. 2, 2016

(54) LAMP SYSTEM REALIZING VARIOUS WAYS FOR CONTROLLING LIGHTING UP THEREOF

(71) Applicants: Hsiao Chang Tsai, Taipei (TW); Xiao Bing Tu, Taipei (TW)

(72) Inventors: Hsiao Chang Tsai, Taipei (TW); Xiao Bing Tu, Taipei (TW)

( * ) Notice: Subject to any disclaimer, the term of this patent is extended or adjusted under 35 U.S.C. 154(b) by 3 days.

(21) Appl. No.: 14/458,269

(22) Filed: Aug. 13, 2014

(65) Prior Publication Data
US 2016/0050726 A1 Feb. 18, 2016

(51) Int. Cl.
*H05B 33/08* (2006.01)
*H05B 37/02* (2006.01)

(52) U.S. Cl.
CPC ........ *H05B 33/0815* (2013.01); *H05B 37/0218* (2013.01); *H05B 37/0227* (2013.01)

(58) Field of Classification Search
CPC .. H05B 37/0227; H05B 37/02; H05B 37/029; H05B 37/0218; H05B 37/0272; H05B 33/0815; H05B 33/0818; H05B 33/0812; H05B 33/0872; H05B 33/083; H05B 33/0833; Y02B 20/46; Y02B 20/208
USPC ......... 315/307, 291, 312, 360, 246, 247, 153, 315/149, 201
See application file for complete search history.

(56) References Cited

U.S. PATENT DOCUMENTS

| | | | | |
|---|---|---|---|---|
| 4,315,596 | A * | 2/1982 | Johnson et al. | ................. 236/94 |
| 9,035,566 | B2 * | 5/2015 | Du | ..................... H05B 33/0818 315/291 |
| 2008/0179497 | A1 * | 7/2008 | Maniam et al. | ......... 250/214 AL |
| 2009/0140691 | A1 * | 6/2009 | Jung | .............................. 320/108 |
| 2011/0180687 | A1 * | 7/2011 | Rains et al. | .................... 250/205 |
| 2011/0248172 | A1 * | 10/2011 | Rueger et al. | ................. 250/340 |
| 2012/0248312 | A1 * | 10/2012 | Soccoli et al. | ........... 250/339.14 |
| 2012/0248992 | A1 * | 10/2012 | Jeon et al. | ...................... 315/155 |
| 2013/0030589 | A1 * | 1/2013 | Pessina et al. | ................ 700/295 |
| 2014/0125234 | A1 * | 5/2014 | Sadwick | ....................... 315/158 |
| 2016/0057818 | A1 * | 2/2016 | Tsai | .................... H05B 33/086 315/153 |

OTHER PUBLICATIONS

STMicroelectronics, Application Note AN2972 'Designing an antenna for the M24LR64-R dual interface I2C/RFID device', Feb. 2010.*
STMicroelectronics, PowerPSoC Intelligent LED Driver, Document No. 001-46319 Rev. H, Revised Sep. 17, 2009.*

* cited by examiner

*Primary Examiner* — Haissa Philogene

(57) ABSTRACT

A lamp control system with various control ways includes an AC power source; a wave generator; a driving circuit; a lamp set receiving power from the driving circuit to drive the lamp set; a microprocessor receiving power from the lamp set as driving power thereof and receiving, signals from the wave generator as driving signals; a switching circuit; the switching circuit being connected to the microprocessor and receiving the signals from the microprocessor for operating the lamp; the switching circuit also controlling current flowing through the lamp set and thus controlling the illumination of the lamp set; a sensing circuit connected to the microprocessor for detecting variations of environment illuminations and then transferring detecting signals to the microprocessor to cause the microprocessor to control the switching circuit to operate the lamp set; and an illumination setting by which a user can set illumination of the lamp set.

7 Claims, 4 Drawing Sheets

LAMP SYSTEM REALIZING VARIOUS WAYS FOR CONTROLLING LIGHTING UP THEREOF

FIELD OF THE INVENTION

The present invention is related to illuminations and lamp control, and in particular to an LED lamp system realizing various ways for controlling lighting up thereof, which is suitable for manual operation, moving object sensing operation and auto-adjusting operation.

BACKGROUND OF THE INVENTION

LED lamps are a kind of new lamps which have high illumination and long lifetime with low power consumption so that LED lamps are widely used currently and the functions thereof are expanded greatly, for example, using a moving object detection switch to control the lighting of the LED lamps. Currently market selling LED lamps mainly includes three different kinds, one emitting warm light with color temperatures between 2700K-3000K; another emitting warm white light with color temperatures between 4000K-5500K; and the other emitting cool white light with color temperatures between 5500K-6500K. However, in current design, the moving object detection circuit is separated from the LED lamps and the structure thereof is complicated to be difficult in installation with low sensitivity and high installation time. The lighting of the LED lamp is only controlled by the moving object detection circuit, while it is inconvenient to users and thus the using of LED lamps is confined and not widely in many markets. In many fields, it is desired to use the moving object detecting LED lamps as a general used lamp, while the above mentioned LED lamps are not suitable for this object.

SUMMARY OF THE INVENTION

Accordingly, to overcome the above said defects in the prior art, the present invention provides a lamp control system with various control ways, in that the lamp can be controlled manually, or by sensors for detecting moving objects or for detecting environmental illuminations. The compact circuit structure for constructing the structure is also provided in the present invention.

To achieve above object, the present invention provides a lamp control system with various control ways, comprising: an AC power source; a wave generator connected to the power source for generating driving signals with pre-determinant waveforms based on the switching actions from the AC power source; a driving circuit connected to the power source for converting power from the AC power source into analog signals and for voltage steadiness to provide power to other elements; a lamp set receiving power from the driving circuit to drive the Lamp set; a microprocessor receiving power from the Lamp set as driving power thereof and receiving signals from the wave generator as driving signals; a switching circuit connected to the lamp set for actuating or de-actuating the lamp set so as to light up or distinguish the lamp set; the switching circuit being connected to the microprocessor and receiving the signals from the microprocessor for operating the lamp; the switching circuit also controlling current flowing through the lamp set and thus controlling the illumination of the lamp set; a sensing circuit connected to the microprocessor; the sensing circuit serving to detect variations of environment illuminations and then transferring detecting signals to the microprocessor to cause the microprocessor to control the switching circuit to operate the lamp set; and an illumination setting circuit connected to the microprocessor by which a user can set illumination of the lamp set; and the illumination setting circuit being connected to an illumination storage unit of the microprocessor.

DETAILED DESCRIPTION OF THE INVENTION

Figure 1:
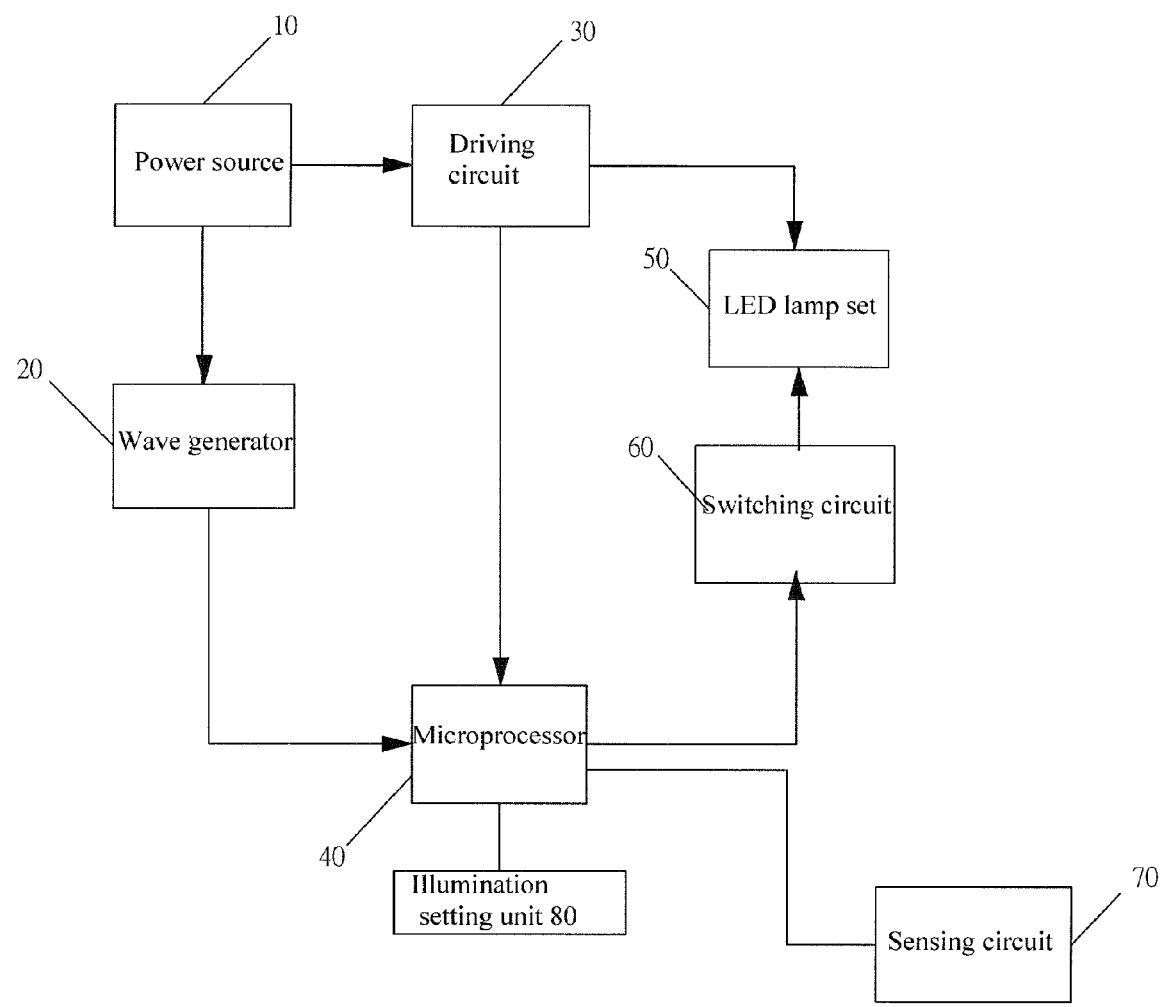
FIG. 1 is a system block diagram showing a function structure of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1 to 6, the structure of the present invention is illustrated. In the present invention, the lamp set may be various kinds of lamps, such as bulbs, cylindrical lamps, plane lamps, ceiling lamps, flush-mounted ceiling lamps, oil lamps, mine lights, lights for LEDs or LCDs, fluorescent lights, PAR lamps, etc. The shapes thereof are changeable with the requirements in the design of the lamps. However, the present invention is especially suitable for LED lamps. The elements of the present invention will be described herein.

A power source 10 is an alternative power source.

A wave generator 20 is connected to the power source 10 for generating driving signals with pre-determinant waveforms based on the switching actions from the power source 10. The waveforms may be digital signal waveforms.

A driving circuit 30 is connected to the power source for converting the power from the power source into analog signals and voltage steadiness so as to provide power to other elements.

An LED lamp set 50 receives power from the driving circuit 30 to drive the LED lamp set 50.

A microprocessor 40 receives power from the LED lamp set 50 as driving power thereof and receives signals from the wave generator 20 as driving signals.

A switching circuit 60 is connected to the LED lamp set 50 for actuating or de-actuating the LED lamp set 50 so as to light up or distinguish the LED lamp set 50. The switching circuit 60 is connected to the microprocessor 40 and receives the signals from the microprocessor 40 for operating the LED lamp set 50. Furthermore, the switching circuit 60 also controls current flowing through the LED lamp set 50 and thus controls the illumination of the LED lamp set 50.

A sensing circuit 70 is connected to the microprocessor 40. The sensing circuit 70 serves to detect variations of environment illuminations and then transfers detecting signals to the microprocessor 40 to cause the microprocessor 40 to control the switching circuit 60 to operate the LED lamp set 50.

An illumination setting circuit 80 is connected to the microprocessor 40 by which a user can set illumination of the LED lamp set 50. The illumination setting circuit 80 is connected to an illumination storage unit 81 of the microprocessor 40.

Figure 2:
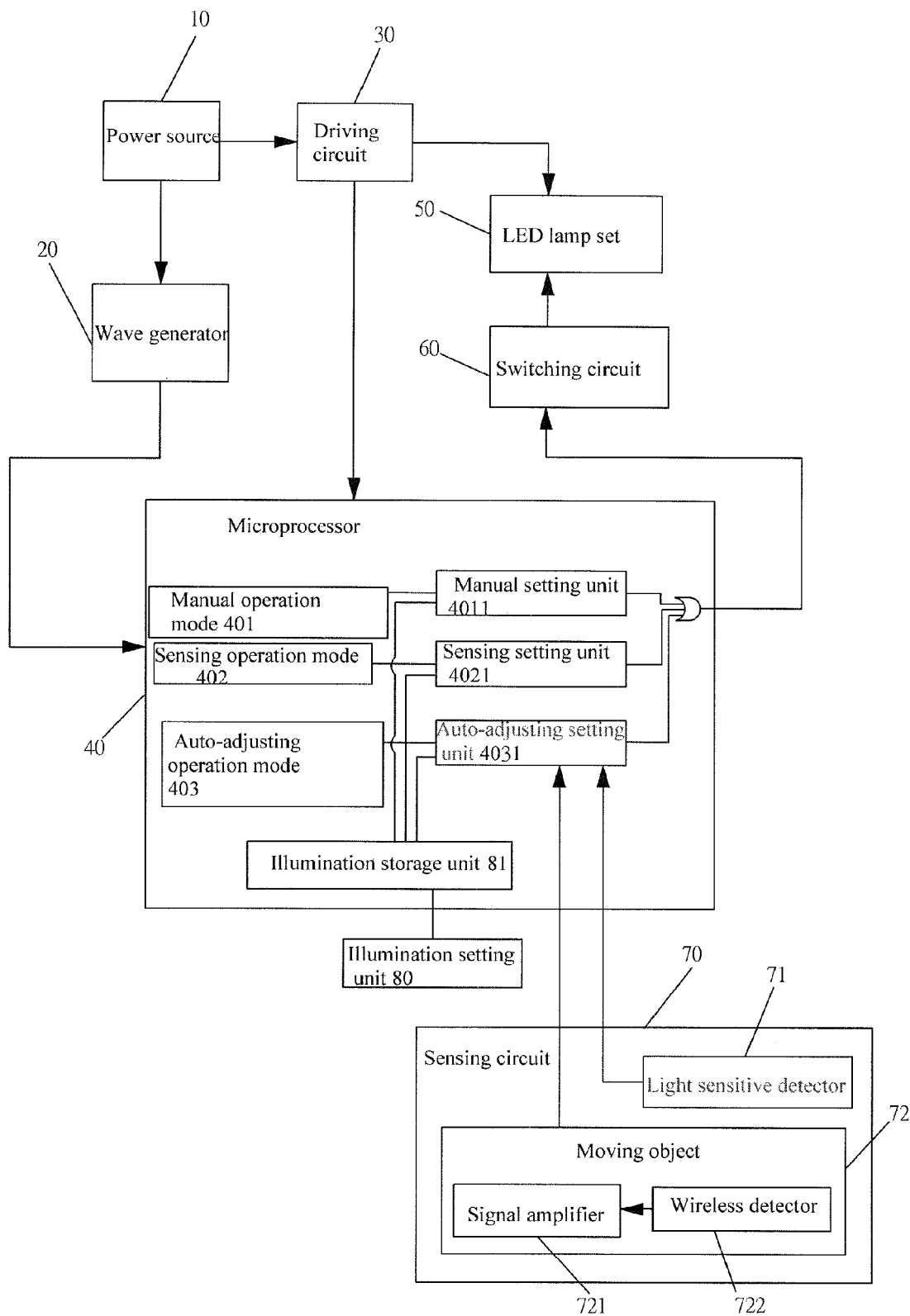
FIG. 2 is a block diagram showing the structure of FIG. 1 with various controlling modes in the present invention.

With reference to FIGS. 1 and 2, the operation of the present invention will be described herein.

Manual Operation Mode 401

In this mode, the user operates the power source 10 to set the system of the present invention in the manual operation mode 401. Then a manual setting unit 4011 in the microprocessor 40 sets the LED lamp set 50 to be only receive the manual operations from the user for deciding the illumination state of the LED lamp set 50. Then driving signals from the wave generator 20 enters into the microprocessor 40 and then the microprocessor 40 instructs the switching circuit 60 for actuating or de-actuating the LED lamp set 50, while the sensing circuit 70 does not operate.

Sensing Operation Mode 402

The user operates the power source 10 to set the system of the present invention into a sensing operation mode 402. Then a sensing setting unit 4021 in the microprocessor 40 sets the LED lamp set 50 to be only receives the signals from the sensing circuit 70 to decide the illumination of the LED lamp set 50. The driving signals from the sensing circuit 70 is transferred into the microprocessor 40 and then the microprocessor 40 controls the switching circuit 60 to actuate or de-actuate the LED lamp set 50.

Auto-Adjusting Mode 403

Under the sensing operation mode 402, the user operates the power source 10 to set the system of the present invention into an auto-adjusting mode 403. In this mode, when it is sensed that no moving object in the sensing environment, an auto-adjusting setting unit 4031 sets the LED lamp set 50 to be auto-adjusted with time. For example, when the LED lamp set 50 is installed in a parking lot and no moving object in the parking lot, illuminations of the LED lamp set 50 can be reduced gradually. For example, if the original illumination is 80% of full illumination, after one minute, the illumination is reduced to 50%, and after two minutes, the illumination is further reduced to 20% so as to achieve the object of power saving.

In the present invention, the sensing circuit 70 includes the following two kinds of sensors.

A moving object detection circuit 72 serves to sense moving objects passing through a detection area and then transfers detecting signals to the microprocessor 40 to cause the microprocessor 40 to control the switching circuit 60 to operate the LED lamp set 50. The moving object detection circuit 72 includes a wireless detector 722 for detecting whether emitted wireless waves (for example, infrared light, or RF waves) is shielded. Then detection results are transferred to a signal amplifier 721 for signal amplification and then the detection result is transferred to the microprocessor 40.

In the present invention, the wireless detector may be an infrared detector and an RF detector.

A light sensitive detector 71 serves to detect environment illuminations. Different illumination will cause the light sensitive detector 71 to generate different driving signals to be transferred to the microprocessor 40.

After the microprocessor 40 receives the driving signals from the light sensitive detector 71, it determines the size of the driving current and refers the setting value from the illumination setting circuit 80 so as to determine the lighting illumination of the LED lamp set 50 and then the microprocessor 40 drives the switching circuit 60 to cause the LED lamp set 50 to light up with the determined lighting illumination.

For example, if the user sets the illumination is 80 lumens in the illumination setting circuit 80, while the environmental illumination detected by the light sensitive detector 71 is 30 lumens. Then, the microprocessor 40 will drive the switching circuit 60 to cause the LED lamp set 50 to light up with an illumination of 50 lumens.

Therefore, under the sensing operation mode 402, the system of the present invention determines whether a person moves into an illumination space of the moving object detection circuit 72. If yes, the microprocessor 40 opens the LED lamp set 50. Then the light sensitive detector 71 determines an illumination for the illuminating space thereof and then the illumination is transferred to the microprocessor 40. The microprocessor 40 gets the illumination of the LED lamp set 50 by subtracting the illumination of the lighting space from the setting value in the illumination setting circuit 80.

One arrangement for the circuit of the present invention will be described herein. However, the description in the following is not used to confine the scope of the present invention, all other circuit capable of realizing the function block in FIG. 1 is within the scope of the present invention.

Figure 3:
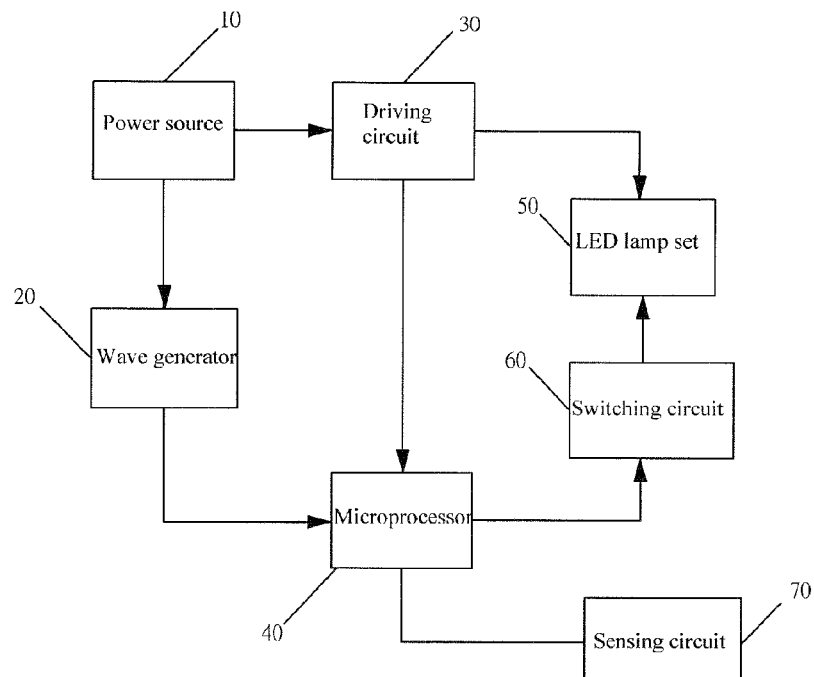
FIG. 3 shows a structure of FIG. 1, where the waveform generator is an optical coupler.
Figure 4:
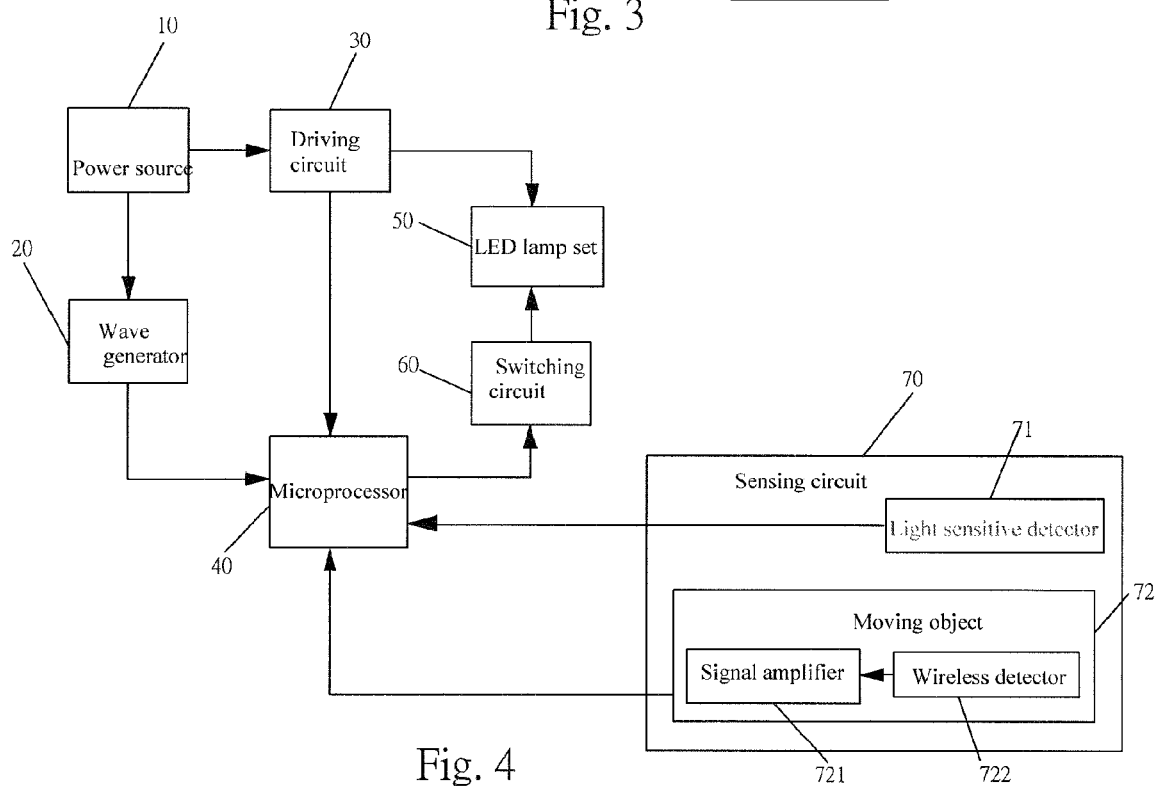
FIG. 4 shows the structure of FIG. 1, wherein the details for sensing and detection is shown.

With reference to FIG. 3, the circuit of the present invention as illustrated in FIG. 1 is shown, while the illumination setting circuit 80 is neglected and the wave generator 20 is realized by an optical coupler 20.

Referring to FIG. 6, an input end the optical coupler 20 is connected to the AC power source 10 and an output end thereof is thereof to a first signal input of the microprocessor 40. The optical coupler 20 generates optical coupling signals. In this embodiment, the optical coupling signals presents rectangular waves. A second signal input end 43 of the microprocessor 40 is connected to the light sensitive detector 71. A third signal input end 42 of the microprocessor 40 is connected to the moving object detection circuit 72, especially to a signal amplifier 721 of the moving object detection circuit 72. The light sensitive detector 71 detects environmental light intensity and then outputs rectangular waves to the second signal input end 43. The moving object detection circuit 72 detects moving objects and then outputs rectangular waves to the third signal input end 42.

A pulse modulation output end of the microprocessor 40 is connected to a control end of the switching circuit 60. A third signal input end of the microprocessor 40 processes the received rectangular signals and then outputs control signals from the pulse modulation output end to the switching circuit 60. The switching circuit 60 is connected to the LED lamp set 50 for driving the LED lamp set 50 to light up. The driving circuit 30 is connected with the microprocessor 40 and the LED lamp set 50 for providing driving currents.

For clearly describing the control circuit of the present invention, an embodiment is described herein.

Figure 5:
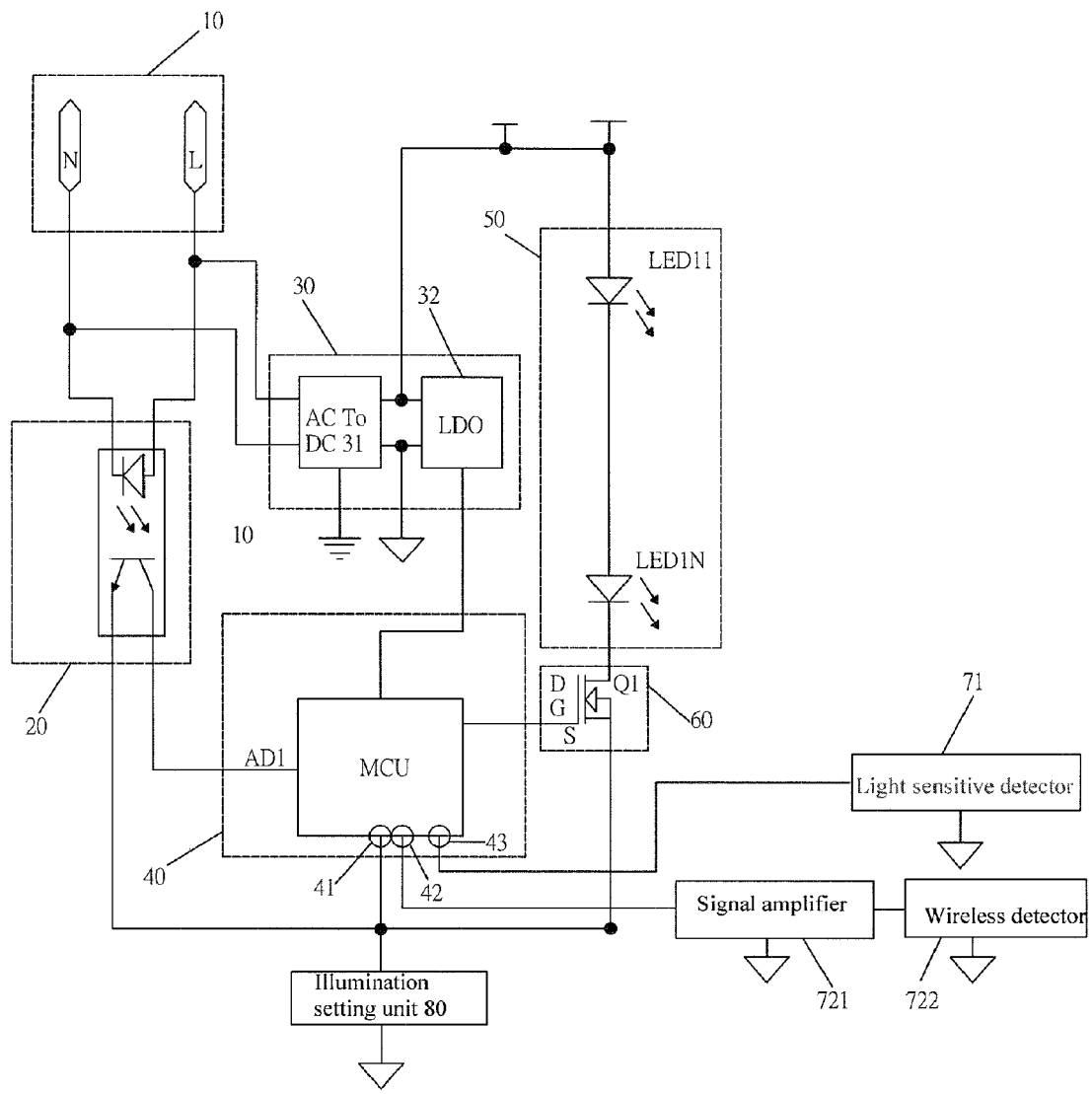
FIG. 5 shows a circuit for realizing the function of the present invention.

With reference to FIG. 5, the driving circuit 30 includes an AC to DC circuit 31 and a voltage regulation (LDO) circuit 32. An output end of the voltage regulation circuit 32 is connected to a voltage input end of the microprocessor 40 for providing working voltage Vcc to the microprocessor 40. The voltage regulation circuit 32 is a low difference linear voltage integrated circuit. The AC to DC circuit 31 serves to convert AC current from the AC power source 10 to DC current which is voltage and current steadily. The voltage and current are adjustable by the AC to DC circuit 31. An output end of the AC to DC circuit 31 is connected to the LED lamp set 50 for providing working power to the LED lamp set 50.

Two input ends of the optical coupler 20 are connected to the two phases of the AC power source 10. One output end of the optical coupler 20 is connected to a signal input end (AD1 port) of the microprocessor 40. The AD1 port is a mode conversion port of the microprocessor 40 for converting AC signals to DC signals. Another end of the optical coupler 20 is connected to a negative output end of the driving circuit 30.

The process for generating rectangular pulse in the AD1 port will be described herein. An input end of the optical coupler 20 is connected to an output end and a ground end of the AC power source 10. When the positive half cycle of the AC current flows through a positive electrode of the light emitting diode of the optical coupler 20, the light emitting diode of the optical coupler 20 will light up to conduct the transistor of the optical coupler 20. A voltage level pulse into the AD1 port is converted into low level from a high level. When the AC current of the AC power source 10 is in a negative half cycle, the light emitting diode of the optical coupler 20 is cut off so that the light emitting diode of the optical coupler 20 does not light up and the transistor thereof does not conduct so that the pulse input the AD1 port is converted into high level from the original low level. The process is repeated continuously, as a result, rectangular waves are generated.

Thus, the present invention causes that the LED lamp set 50 may be as an illuminating lamp with control functions for adjusting the illumination with the presence of move objects. In the present invention, the LED lamp set 50 may emit cool white light, warm white light or yellow light as desired.

In this embodiment, the switching circuit 60 is a field effect transistor. A drain (D) electrode of the field effect transistor is connected electrode of the LED lamp set 50. The S electrode of the field effect transistor is connected to a negative gate of the driving circuit 30. The gate (G) of the field effect transistor is connected to the pulse width modulation signal output end of the microprocessor 40 which serves to provide pulse width modulation signals to the field effect transistor for opening or closing the field effect transistor. The pulse width modulation signal output end of the microprocessor 40 generates pulse width modulation signals continuously to drive the field effect transistor and thus the LED lamp set 50 lights up.

In the present invention, the lamp set may be various kinds of lamps, such as bulbs, cylindrical lamps, plane lamps, ceiling lamps, flush-mounted ceiling lamps, oil lamps, mine lights, lights for LCDs, fluorescent lights, PAR lamps, etc. The shapes thereof are changeable with the requirements in the design of the lamps. The power of the power source 10 is adjustable for matching the requirements of the lamps.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A lamp control system with various control ways, comprising:
    an AC power source; the AC power source being an LED driving power;
    a wave generator connected to the AC power source for generating driving signals with pre-determinant waveforms based on switching actions from the AC power source; the wave generator being an optical coupler for generating optical coupling signals which are rectangular waves;
    a driving circuit connected to the power source for converting power from the AC power source into analog signals and for voltage steadiness to provide power to other elements; the driving circuit including an AC to DC circuit and a voltage regulating circuit connected to an output end of the AC to DC circuit; and the voltage regulating circuit being a low voltage difference and linear voltage regulating integrating circuit; and
    a lamp set receiving power from the driving circuit to drive the lamp set; and the lamp set being an LED lamp set;
    a microprocessor receiving power from the lamp set as driving power thereof and receiving signals from the wave generator as driving signals;
    a switching circuit connected to the lamp set for actuating or de-actuating the lamp set so as to light up or distinguish the lamp set; the switching circuit being connected to the microprocessor and receiving the signals from the microprocessor for operating the lamp; the switching circuit also controlling current flowing through the lamp set and thus controlling the illumination of the lamp set;
    a sensing circuit connected to the microprocessor; the sensing circuit serving to detect variations of environment illuminations and then transferring detecting signals to the microprocessor to cause the microprocessor to control the switching circuit to operate the lamp set; and
    an illumination setting circuit connected to the microprocessor by which a user can set illumination of the lamp set; and the illumination setting circuit being connected to an illumination storage unit of the microprocessor; and
    wherein two input ends of the optical coupler are connected to two phases of the AC power source; one output end of the optical coupler is connected to a signal input end (AD1 port) of the microprocessor; the AD1 port is a mode conversion port of the microprocessor for converting AC signals to DC signals; and another end of the optical coupler is connected to a negative output end of the driving circuit; and
    the switching circuit is a field effect transistor; a drain (D) electrode of the field effect transistor is connected to a negative electrode of the LED lamp set; the S electrode of the field effect transistor is connected to a negative gate of the driving circuit; the gate (G) of the field effect transistor is connected to the pulse width modulation signal output end of the microprocessor which serves to provide pulse width modulation signals to the field effect transistor for opening or closing the field effect transistor; the pulse width modulation signal from an output end of the microprocessor generates pulse width modulation signals continuously to drive the field effect transistor and thus the LED lamp set lights up.

2. The lamp control system with various control ways as claimed in claim 1, wherein in a manual operation mode, a user operates the power source to set the system in the manual operation mode; that is: a manual setting unit in the microprocessor sets the lamp set to be only receive the manual operations from the user for deciding illumination state of the lamp set; and then driving signals from the wave generator enters into the microprocessor and then the microprocessor instructs the switching circuit for actuating or de-actuating the lamp set, while the sensing circuit does not operate; and
    wherein in a sensing operation mode, a user operates the power source to set the system in a sensing operation mode; that is: a sensing setting unit in the microprocessor sets the lamp set to be only receives the signals from the sensing circuit to decide the illumination of the lamp set; the driving signals from the sensing circuit into the microprocessor and then the microprocessor controls the switching circuit to actuate or de-actuate the lamp set; and
    wherein in an auto-adjusting mode, a user operates the AC power source to set the system into the auto-adjusting mode; that is; when it is sensed that no moving object in the sensing environment, an auto-adjusting setting unit sets the lamp set to be auto-adjusted with time.

3. The lamp control system with various control ways as claimed in claim 1, wherein the LED lamp set contains a plurality of LED lamps which are connected serially or in parallel.

4. The lamp control system with various control ways as claimed in claim 1, wherein the waveforms generated by the wave generator are used as digital signal waveforms.

5. The lamp control system with various control ways as claimed in claim 1, wherein the sensing circuit comprises of:
   a moving object detection circuit for detecting moving objects passing through a detection area and then transferring detecting signals to the microprocessor to cause the microprocessor to control the switching circuit to operate the lamp set; the moving object detection circuit including a wireless detector for detecting whether emitted wireless waves is shielded; then detection results being transferred to a signal amplifier for signal amplification and then the detection result being transferred to the microprocessor; and
   a light sensitive detector for detecting environment illuminations; different illumination will cause the light sensitive detector to generate different driving signals to be transferred to the microprocessor; and wherein after the microprocessor receives the driving signals from the light sensitive detector, it determines the size of the driving current and refers the setting value from the illumination setting circuit so as to determine the lighting illumination of the lamp set and then the microprocessor drives the switching circuit to cause the lamp set to light up with the determined lighting illumination.

6. The lamp control system with various control ways as claimed in claim 5, wherein the wireless detector is an infrared detector and an RF detector.

7. The lamp control system with various control ways as claimed in claim 1, wherein the driving circuit includes an AC to DC circuit and a voltage regulation (LDO) circuit; an output end of the voltage regulation circuit is connected to a voltage input end of the microprocessor for providing working voltage to the microprocessor; the voltage regulation circuit is a low difference linear voltage integrated circuit; the AC to DC circuit serves to convert AC current from the AC power source to DC current which is voltage and current steady; the voltage and current are adjustable by the AC to DC circuit; an output end of the AC to DC circuit is connected to the LED lamp set for providing working power to the LED lamp set.

* * * * *